Figure 8:
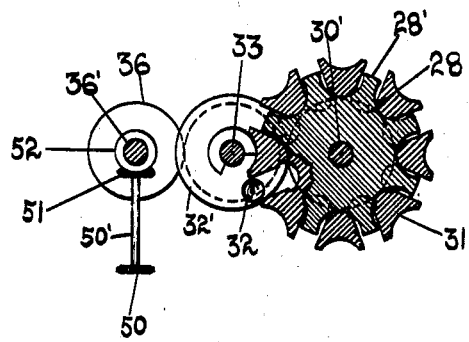

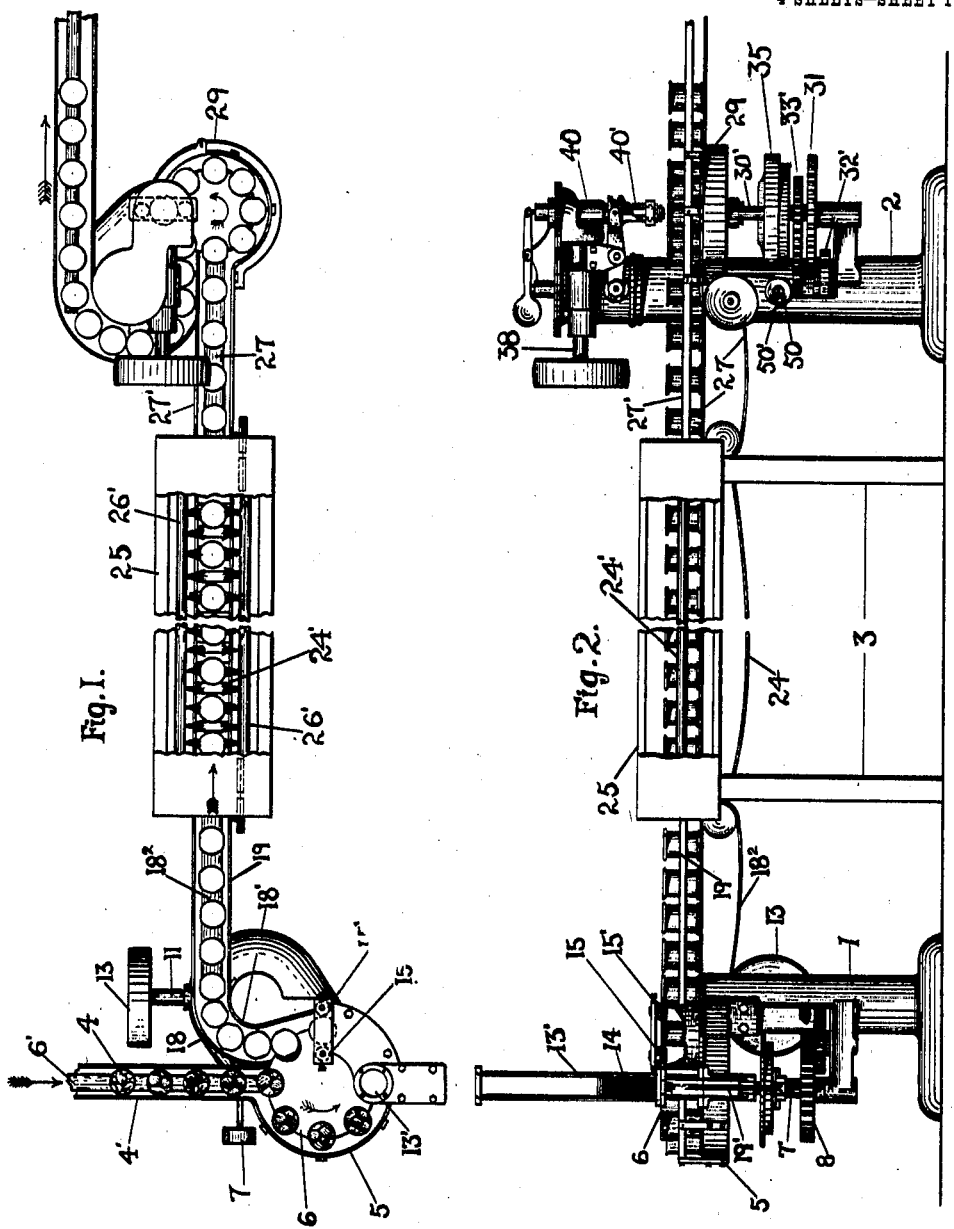

J. M. YOUNG.
ORGANIZED APPARATUS FOR PRESERVING FOOD PRODUCTS.
APPLICATION FILED OCT. 22, 1912.
1,070,095.  Patented Aug. 12, 1913.
4 SHEETS—SHEET 2.
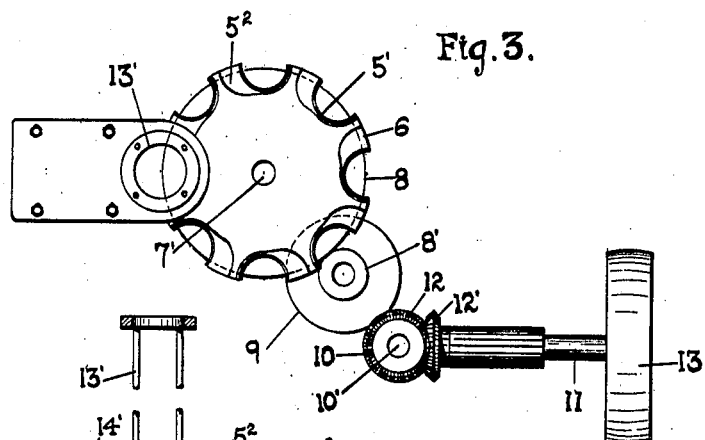
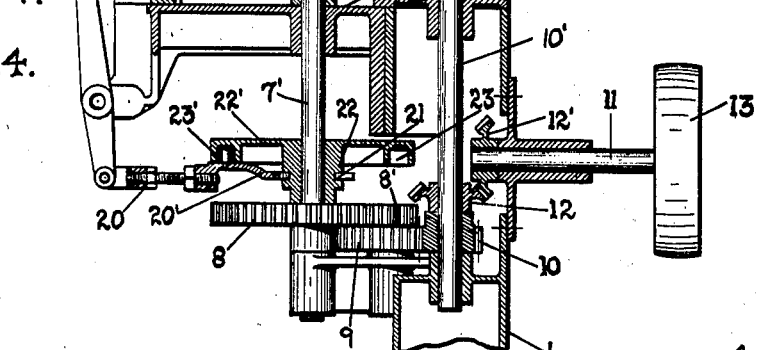
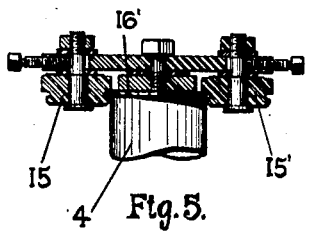
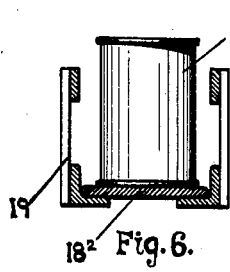
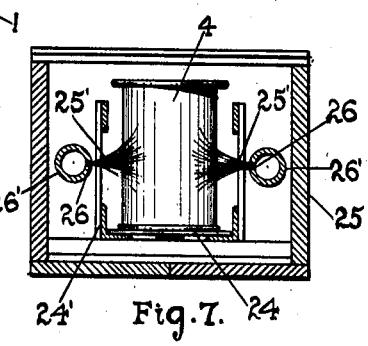

J. M. YOUNG.
ORGANIZED APPARATUS FOR PRESERVING FOOD PRODUCTS.
APPLICATION FILED OCT. 22, 1912.

1,070,095.

Patented Aug. 12, 1913.
4 SHEETS—SHEET 3.

WITNESSES
Wm. F. Booth
S. Construie

INVENTOR
John M. Young
BY
ATTORNEY

J. M. YOUNG.
ORGANIZED APPARATUS FOR PRESERVING FOOD PRODUCTS.
APPLICATION FILED OCT. 22, 1912.

1,070,095.

Patented Aug. 12, 1913.
4 SHEETS—SHEET 4.

UNITED STATES PATENT OFFICE.

JOHN MARSHALL YOUNG, OF SAN FRANCISCO, CALIFORNIA, ASSIGNOR TO AMERICAN CAN COMPANY, A CORPORATION OF NEW JERSEY.

ORGANIZED APPARATUS FOR PRESERVING FOOD PRODUCTS.

1,070,095. Specification of Letters Patent. Patented Aug. 12, 1913.

Application filed October 22, 1912. Serial No. 727,134.

*To all whom it may concern:*

Be it known that I, JOHN M. YOUNG, a citizen of the United States, residing in the city and county of San Francisco and State of California, have invented certain new and useful Improvements in Organized Apparatus for Preserving Food Products, of which the following is a specification.

The hereinafter described invention relates to an organized apparatus for temporarily applying covers to filled cans, properly exhausting or removing the air from the product of the containers that are processed or sterilized and finally double seaming the covers to the end of the filled cans or product containers for the formation of a hermetically sealed joint, the apparatus being more particularly designed for the carrying out of the process for preserving food products fully set forth and described in my pending application for Letters Patent Serial No. 680,927, filed in the United States Patent Office on the 1st day of March, 1912.

Heretofore it has been customary in the canning of food products not to fill the can or container entirely full of the food product, but to leave in the same some air space. By different means some of the air in this space is removed when the can is hermetically closed, which is done to cause a partial vacuum which draws in or collapses the ends and sides of the can or product container. It is by this means that canners and consumers decide that the contents of a can are good, for food product decaying and not fit for food emits gases which causes the sides or ends of the can or container to bulge outward.

When food products are sterilized or processed in hermetically closed metal containers, some of the good products emit certain gases from their own chemical constituents and others contain chemicals that attack the metal of the container causing certain gases to form, and if sufficient air space has not been left or provided in the can, and sufficient air expelled from this space to cause a vacuum into which this gas can go and still leave sufficient vacuum in the container to draw the ends and sides of the container inward, the gas formed will cause the ends to bulge outwardly more or less, giving the appearance of a container of food unfit for use, although the food product is in perfect healthy condition. Under such conditions the customers reject the filled containers and by so doing the canners or packers annually are occasioned large loss. Such cans are known to the trade as springers or puffs.

It has been customary in the canning of food products in sanitary or open top cans, to employ one of two methods to accomplish the removing of air. One method is to hermetically close the can with the food product in it, heat it sufficiently to expand the air and food product to the desired amount, then punch a small hole in the side or end of the can in order to allow the expanded air to escape, then quickly soldering up the puncture so made. The can is then submitted to sufficient heat to kill the bacteria in the food product and in the air remaining in the can. Such method is costly, and it requires the rehandling of the filled can, the punching of the hole therein, the solder to close it, and the labor to apply the solder. It is also objectionable because when the hole is punched and the expanded air rushes out it carries some of the liquid contents of the can with it, making an inferior quality of food product. This is especially true when fish is in the can, as the oil escapes and leaves the fish dry. The other method is to pass a sanitary or open top can, without a cover on the can, through a partially open heated receptacle and expel the air therefrom by the expansion of the food product and the air. When the filled can comes out of the heating or cooking receptacle, the cover is then applied and the can and cover then hermetically closed. The can is then submitted to sufficient heat to kill the bacteria in the food product and the air in the can. This method is objectionable because it is necessary to transfer the can from the heated receptacle to the means for putting the cover on the can and the means for hermetically closing it, and as soon as the can comes out of the heated receptacle the air in it being expanded, rises out of the can and the cooler air of the atmosphere replaces it. The top of the can being open, any draft of air passing over it blows the heated air out of the can. The air expands much more than the food product and for such reason it is necessary to keep the expanded or heated air in the can, which is somewhat difficult, due to the fact that on account of the nature of the business and the necessity for fresh air for the employees, canneries are very drafty. The above method is also very objectionable when steam is blown into the receptacle for the heating of the can, as the food product in the can being cold, the steam coming in direct contact with it condenses and partially fills with water the air space purposely left in the can, causing too small an amount of space in the can with the air partially removed, so that after processing and sufficient time elapses for the chemical constituents of the food product to attack the can, gases form and make the ends bulge outwardly and the cans become what are commonly known as springers or puffs.

The present invention automatically and cheaply clenches or partially fastens the cover on the filled can, automatically discharging the same into the exhaust box or cooker, where the food product and air in the can are heated to the desired temperature for expelling the air from the can between the body of the can and the clenched or partially fastened cover, no steam being permitted to enter into the can to condense against the cold food product as the heat causes the cold air and food product to expand, which causes the air to pass out of instead of steam coming into or entering the can. The cover being secured to the filled can when it leaves the exhaust box or cooker, the remaining air in the can, which is expanded and light, is prevented from rising out of the can by the held cover. The cover and sides of the can coming in contact with the cooler atmosphere cause the hot or expanded air in the can to commence to cool and contract and this draws the cover closer on the can by the causing of a partial vacuum in the can. The cover being clenched on the can when it comes from the exhaust box or cooker prevents the heated air in the can from being blown out by drafts of air while being transferred to the double seamer, as it does without a cover being previously applied. The carrier means of the exhaust box or cooker delivers the can automatically to the double seamer, which automatically hermetically closes the cover and discharges the can. This mechanism cheaply makes an even and uniform exhaust in cans and maintains the space left in cans when packed with food products, while maintaining an even and uniform collapse of the ends and sides of the cans and prevents the filled and treated cans from having the appearance of being spoiled and unfit for food and being rejected by consumers.

To comprehend the invention reference should be had to the accompanying sheets of drawings, wherein—

Figure 9:
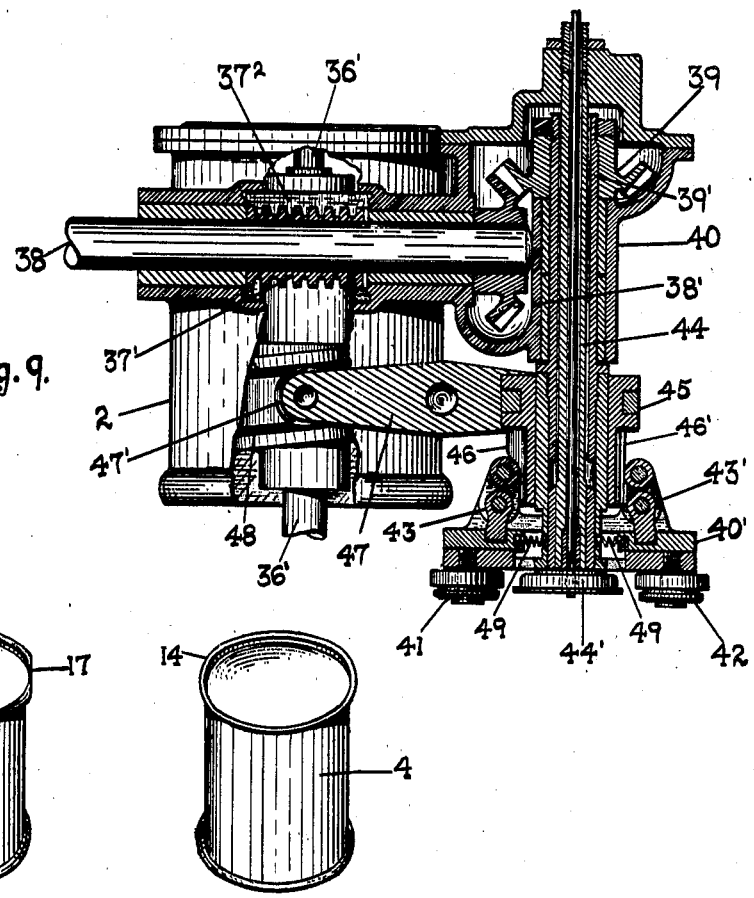
Figure 10:
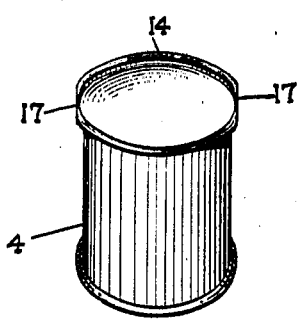
Figure 11:
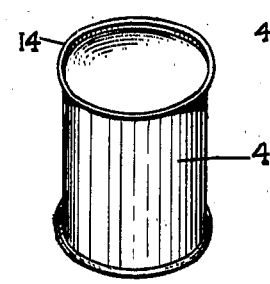
Figure 12:
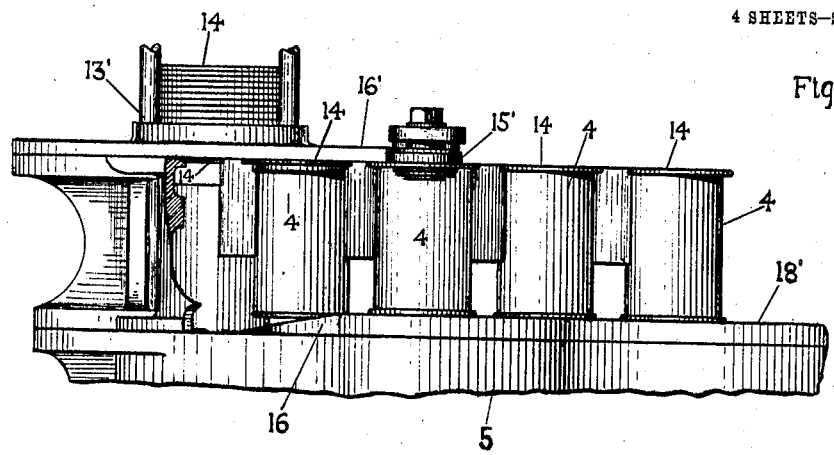
Figure 13:
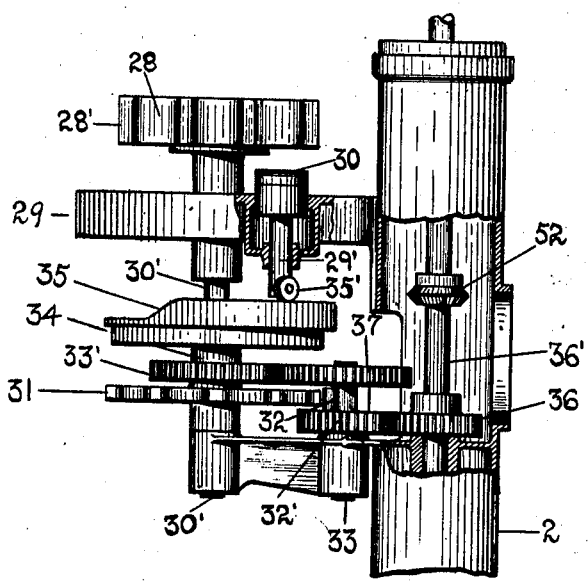

Figure 1 is a broken plan view of the organized apparatus, disclosing the mechanism for temporarily applying a can cover to the filled cans, the means for delivering the filled cans thereto, the exhaust box or cooker, the carrier for transferring the cans with the temporarily applied cover from the clenching mechanism to and through the exhaust box or cooker, and the mechanism for receiving the cans as conveyed from the exhaust box and double seaming the temporarily held cover thereto for the forming of a hermetical seal. Fig. 2 is a side elevation of the mechanism disclosed by Fig. 1 of the drawings, the exhaust box or cooker being partly broken away. Fig. 3 is a detail plan view of the means for transmitting motion to the turret of the clenching mechanism. Fig. 4 is a detail vertical sectional view of the clenching turret, disclosing the relative position of the parts constituting the drive mechanism therefor, also the position of the can cover holder and the means for releasing and feeding the covers therefrom and placing the same above the open end of the filled cans. Fig. 5 is a detail view of the rolls for temporarily clenching the covers to the filled cans prior to being passed into and through the exhaust box or cooker. Fig. 6 is a cross sectional view of the runway in which the can carrier works. Fig. 7 is a similar view of the exhaust box or cooker with a filled can positioned therein with its temporarily clenched cover applied thereto. Fig. 8 is a detail plan view of the mechanism for imparting a step or intermittent rotation to the turret receiving the treated cans and conveying the same beneath the double seaming mechanism. Fig. 9 is a side elevation partly broken away of the standard for the actuating mechanism for the double seaming mechanism, the said seaming mechanism being illustrated in vertical section. Fig. 10 is a perspective view of the filled can as delivered from the clenching mechanism with the end cover partly held thereto. Fig. 11 is a similar view of the can after being delivered from the double seaming mechanism. Fig. 12 is a detail view in side elevation disclosing the turret for the clenching mechanism, the cam plate over which the filled cans are propelled by the turret, and the can cover holder for the covers to be applied to the open end of the filled cans prior to being forced between the clenching rolls. Fig. 13 is a detail, part broken, view disclosing the means for imparting rotation to the turret of the double seamer and for placing the filled treating cans into and out of the sphere of the double seaming rolls.

In the drawings, the numerals 1 and 2 designate respectively any suitable form of supporting structures for the turret of the clenching mechanism for temporarily uniting the covers to the filled cans and the turret for receiving the treated cans from the exhaust box or cooker, these turrets being situated a given distance apart and between the same being disposed the supporting structure 3 for the exhaust box or cooker. Any desired form of supporting structure may be employed in place of the one illustrated and, if preferred due to mechanical reason, a common supporting structure may be utilized for the said parts, the one illustrated being understood to represent conventional forms of supporting structures, which, however, may be departed from at will.

The filled cans 4 are delivered through a suitable runway 4' onto a supporting table 5 and within the segmental seats 5' of a revolving turret 6 by means of a feed belt or carrier 6', Fig. 1 of the drawings, the turret 6 serving as a carrier for the filled cans. The feed belt or carrier is driven by a belt pulley 7, actuated from any suitable source of power. The filled cans as delivered onto the table 5 are received into one of the segmental seats 5' of the turret 6, and as propelled over the table 5 are brought successively beneath the can cover holder in order to receive and have loosely applied thereto a can end or cover. The turret 6 is secured to the upper end portion of a vertical shaft 7', Fig. 4 of the drawings, on which shaft is secured a gear 8 engaging with and driven by a gear 8', which gear in turn is keyed to an upwardly projecting collar or gear 9. The said gear 9 is an idler and is driven by the intermeshing therewith of the gear 10 keyed to the vertical shaft 10'. Motion is imparted to the said shaft 10' from the main drive shaft 11 through the medium of the intermeshing pinions 12 and 12', secured respectively to the shafts 10' and 11, the shaft 11 being driven through the medium of a power belt working over the belt pulley 13.

As the turret 6 carries the filled cans beneath the can cover holder 13' containing a stack of horizontally disposed can covers 14, the reciprocating cover feed knife, slide or blade 14' is first moved outwardly to lower the stack of tops or covers and then inwardly to shear off or separate the lowermost top or cover 14 from the stack contained in the holder 13' leaving the same loosely positioned within a seat 5² in the upper portion of the segmental seat 5' of the turret 6 to place the cover immediately above the open end of the filled can brought and positioned beneath in vertical alinement with the can cover holder 13'. The filled can with its cover loosely positioned above the same is then moved toward the spaced grooved clenching rolls 15 and 15'—Figs. 1 and 2 of the drawings, and as advanced toward the same the filled can is gradually raised by the incline 16—Fig. 12 of the drawings, of the fixed table 5 until its open end is forced against the can cover 14 held thereabove; during this portion of its movement the segmental seat of the turret 6 with the can and cover held therein moving beneath the fixed plate 16' which prevents the upward movement of the cover 14 while the open end of the filled can is forced against the same. As thus held the filled can with its cover is forced between the non-power driven rolls 15 and 15', which are spaced apart a distance slightly less than the diameter of the can cover 14—Fig. 5 of the drawings. These rolls are rotated by frictional contact of the flange of the can cover therewith, with the result as the held filled can is forced between the rollers 15 and 15' the same overflange and partly clenches, fastens or seams the flange of the can cover to the open end of the filled can for temporarily uniting the same thereto at a plurality of points 17—Fig. 10 of the drawings, leaving an air space between the cover and the can at such portions existing between the points 17. The filled can with its partly fastened cover as carried beyond or from between the clenching rolls is guided by a curved wall 18 onto a stationary table 18' from whence they are forced onto the movable carrier 18², traveling within a runway 19.

The feed knife, blade or slide 14' for cutting out the lowermost cover of the stack of covers within the holder 13' is actuated for reciprocating movement by a fulcrumed lever 19'—Fig. 4 of the drawings, which lever at its lower end is connected by a link 20 to a slide arm 20'. The inner end of said slide is slotted to straddle the grooved portion 21 of the hub 22 keyed to the vertical shaft 7', and said hub carries the disk 22' provided on its under face with a cam groove 23. In this cam groove works a roll 23' secured to a stud upwardly projecting from the slide arm 20', and said groove is so shaped as to cause the roll 23' working therein to impart the movement to the slide arm 20' for actuating the feed knife, blade or slide 14' through the connecting lever 19' for properly timing its reciprocating movement.

The carrier belt 18² delivers the filled can with its partly applied cover onto an endless carrier 24, which propels the can through a runway 24' situated within an exhaust box or cooker 25 through which the said carrier works. As the filled can is moved through the exhaust box or cooker 25, the same is subjected to the action of steam jets 25' discharged against the slides thereof through a series of perforations or outlets 26 formed in the steam pipes 26' situated within the exhaust box or cooker at each side of the line of cans carried therethrough. The exhaust box or cooker serves in the present case as the means for heating the partially sealed cans to drive off a portion of the vapors formed, the cans so treated being completely sealed before the vapors in the can have condensed to any appreciable extent.

As the cans are heated by the application of the jets of live steam against the same, the air within the can is caused to expand and to escape therefrom through the openings between the unclenched portion of the can covers and the end of the filled cans.

The exhaust box or cooker is a closed top and bottom one, there being provided an inlet opening for the admission of the filled cans therein, and an outlet opening for the discharge therefrom of the sterilized cans. These openings of the exhaust box are usually covered with a flexible flap, so as to prevent as far as possible the escape of heat from within the box.

The sterilized cans as discharged from the exhaust box or cooker are delivered onto an endless chain belt 27, which works within a runway 27' and delivers the filled cans with their cooked or preserved contents with the segmental seats 28 of the turret 28', the can resting on the horizontal table 29 through an opening in which works a vertically movable plunger 29', the head 30 of which is normally flush with the upper surface of the table 29, Fig. 13 of the drawings.

Turret 28' is secured to and driven by the shaft 30', and on said shaft below the table 29 is keyed the Geneva gear 31, which is driven by means of a roll 32, pinned to a gear 32' secured to a short shaft 33 working into and out of the same for imparting a step rotation to the shaft 30'. On the shaft 30' is loosely mounted a gear 33', to the hub 34 of which is secured a cam ring 35, on which the roll 35' carried at the lower end of the plunger 29' rides during the rotation of the shaft 30' for raising and lowering the said plunger. The rotation of the turret 28' carries the filled and treated can around to place the same beneath the double seaming mechanism hereinafter explained and onto the head 30 of the can raising plunger 29', which during the movement of the driven cam ring 35 is gradually raised to place the upper end of the filled can with its partially united cover within the sphere of the double seaming rollers of the seaming mechanism.

Motion is transmitted from the shaft 36' to the gear 32' for actuating the Geneva gear 31 by means of the gear 36 on the shaft 36' meshing with the gear 32', and the rotation imparted to the shaft 33 is transmitted to the loose gear 33' on the shaft 30' by means of the gear 37 secured to the upper end of the shaft 33 meshing with the said gear 33'. The shaft 36' works within the supporting structure 2 for the seaming mechanism. At the upper end thereof, is secured a worm gear 37² which meshes with a worm 37' mounted on the drive shaft 38—Fig. 9 of the drawings. On the outer end of the drive shaft 38 is secured a bevel gear 38', which meshes with a similar gear 39 secured to the upper end of a vertically disposed hollow shaft 39' working in a bearing guide of the overhang portion 40 of the supporting structure 2. To the lower end of the hollow shaft 39' is secured the head 40' carrying the double seaming rollers 41 and 42 which are mounted in the head 40' for swinging movement, the same being thrown inwardly and outwardly respectively by toggle connections 43 and 43'.

Through the tubular shaft 39' works a rod 44, carrying at its lower end a chuck 44', and on said shaft is mounted a slide collar 45. On this collar the inclined cams 46 and 46' are provided, and said slide collar 45 is raised and lowered by the action of the fulcrumed lever 47 having an outer forked end for engaging the grooved portion of the slide collar. At its inner end the fulcrumed lever 47 carries a roll 47' which works within a cam grooved collar 48 secured to the upper end portion of the shaft 36'. On a filled can being clamped against the chuck 44', the first action of the downwardly moving slide collar 45, (due to the timed action of the fulcrumed lever 47), is to cause the inclined cam 46 to engage the toggle connection 43 and force inwardly the roller 41 for partly double seaming the flange of the can cover to the can, and on the upward movement of the slide collar it carries the inclined cam 46' against the toggle connection 43' and places the inclined cam 46' into engagement with the toggle connection 43' to force inwardly the roller 42 for completing the double seaming action.

As the seaming rollers perform their seaming action, the same are restored to normal position by the action of the springs 49, the working parts of the apparatus being also through the timing action imparted thereto being restored to normal position, and the turret 28' given rotation for carrying the double seamed and hermetically sealed can beyond the seaming mechanism and discharging the same from within the sphere of the machine.

By the described apparatus the filled cans are first closed by a cover partially fastened thereto, then subjected to the action of means for expanding and expelling the air therefrom, and finally permanently closing or uniting the partially fastened cover to the filled can for hermetically sealing the same, the whole being automatically performed as a single operation.

While I have described and illustrated the preferred form of an apparatus for automatically and successfully carrying out the invention disclosed herein, I do not wish to be understood as confining myself to such details of construction; for I am aware that various changes and modifications may be made in the various working parts of the described apparatus without creating or necessitating a departure from the spirit of the invention, and I wish to be understood as claiming the same broadly in an organized and automatically operated machine.

The endless belt 27 for conveying the treated cans from the exhauster to the double seaming mechanism is driven by a sprocket 50 on the cross shaft 50', which shaft is driven from the vertical shaft 36' by means of the pinion 51 on the shaft 50' meshing with a pinion 52 on the shaft 36'—Figs. 8 and 13 of the drawings.

Having thus described the invention what is claimed as new and desired to be protected by Letters Patent is—

1. An organized apparatus for the preserving of food products, the same comprising mechanism for receiving an open ended filled can and partially uniting a cover thereto, means for partially removing the air from within the said can, devices for conveying the filled can with its partially united cover from the mentioned mechanism into and through the means for partially removing the air, and mechanism associated with the means for receiving the can therefrom and double seaming the partially united cover to the same for hermetically closing the seam between the can and cover.

2. An apparatus for the described purpose, the same comprising carrier mechanism for receiving and advancing a filled open ended can, devices associated therewith for loosely positioning a can cover relative to the open end of the can, means actuated during the movement of the carrier for forcing the can against the cover and partially uniting the same thereto, means for partially removing air from the partly closed can, devices for conveying the partly closed can from the mentioned carrier to and through said means, and mechanism for receiving the can discharged from the air removing means and double seaming the partially united cover to the same for hermetically closing the seam between the can and cover.

3. An apparatus for the described purpose, the same comprising carrier mechanism for receiving and advancing a filled can, means for delivering the filled can to said carrier, devices associated with and thrown into action during the movement of the carrier for loosely positioning a can cover relative to the open end of the filled can, means for forcing the open end of the can against the can cover, devices for partly uniting the can cover to the can, air removing means to which the filled can with its partly united cover is delivered for the removal of air therefrom, devices for delivering the can into and conveying the same through the air removing means, and mechanism for receiving the treated can and double seaming the partly united cover thereto for hermetically closing the circumferential seam between the can and cover.

4. An organized apparatus for the preservation of food products, the same comprising a carrier for receiving open ended filled cans or vessels, means for receiving the vessels from said carrier and loosely applying a cover to the open end thereof, devices associated therewith for partly securing the cover to the filled vessel, air removing means for receiving the filled vessels with the cover plate partly united thereto and partially removing the air therefrom, devices for conveying the filled vessels with the partly applied cover from the closing means to the said means, and mechanism associated therewith for receiving the cans discharged therefrom and permanently uniting the cover thereto for the formation of a hermetical seal between the said cover and the end of the filled can.

5. An organized apparatus for the preservation of food products, the same comprising associated automatically operated instrumentalities for receiving filled open ended cans, loosely applying and partly uniting a cover thereto, means for receiving said can and means for removing a portion of the air therefrom, and mechanism for permanently securing the cover to the can on leaving the said means for hermetically sealing the end joint between the partly united cover and the filled can.

6. An apparatus for the preservation of food products, the same comprising associated automatically operated instrumentalities for receiving a filled open end vessel, loosely applying and partly uniting a cover thereto, heating the partly closed vessel to drive off a portion of the vapors formed, and hermetically sealing the vessel before the vapors therein have condensed to any appreciable extent.

7. An apparatus for the preservation of food products, the same comprising means for receiving a filled vessel with a partially united cover and heating the vessel to drive off a portion of the vapors formed, and mechanism for receiving the said vessel and completely closing the joint union between the cover and the vessel for hermetically sealing the same before the vapors therein are permitted to condense to any appreciable extent.

In testimony whereof I have signed my name to this specification in the presence of two subscribing witnesses.

JOHN MARSHALL YOUNG.

Witnesses:
  N. A. ACKER,
  D. B. RICHHARDS.